April 19, 1960  L. T. FIKE  2,932,853
TIRE CAPPING APPARATUS
Filed May 23, 1957  2 Sheets-Sheet 1
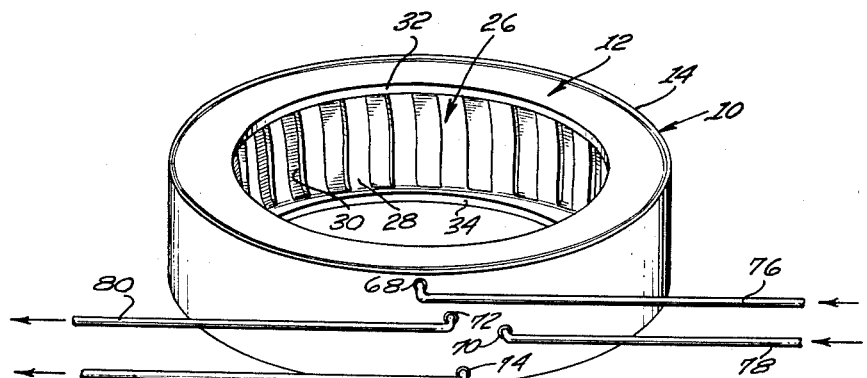
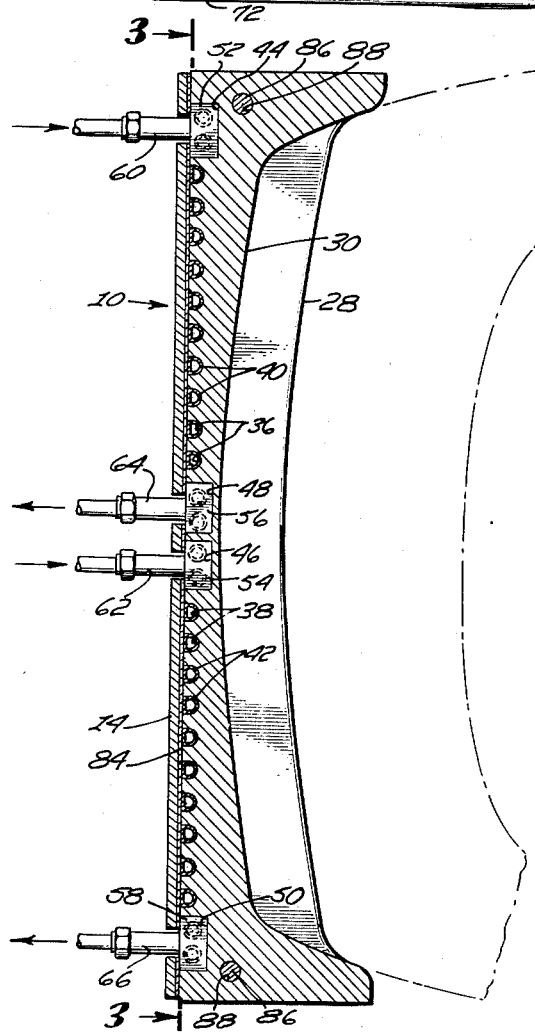
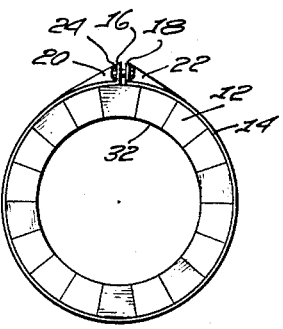
LOUIS T. FIKE
INVENTOR.
FULWIDER, MATTINGLY
BY &HUNTLEY
ATTORNEYS April 19, 1960
L. T. FIKE
2,932,853
TIRE CAPPING APPARATUS
Filed May 23, 1957
2 Sheets-Sheet 2
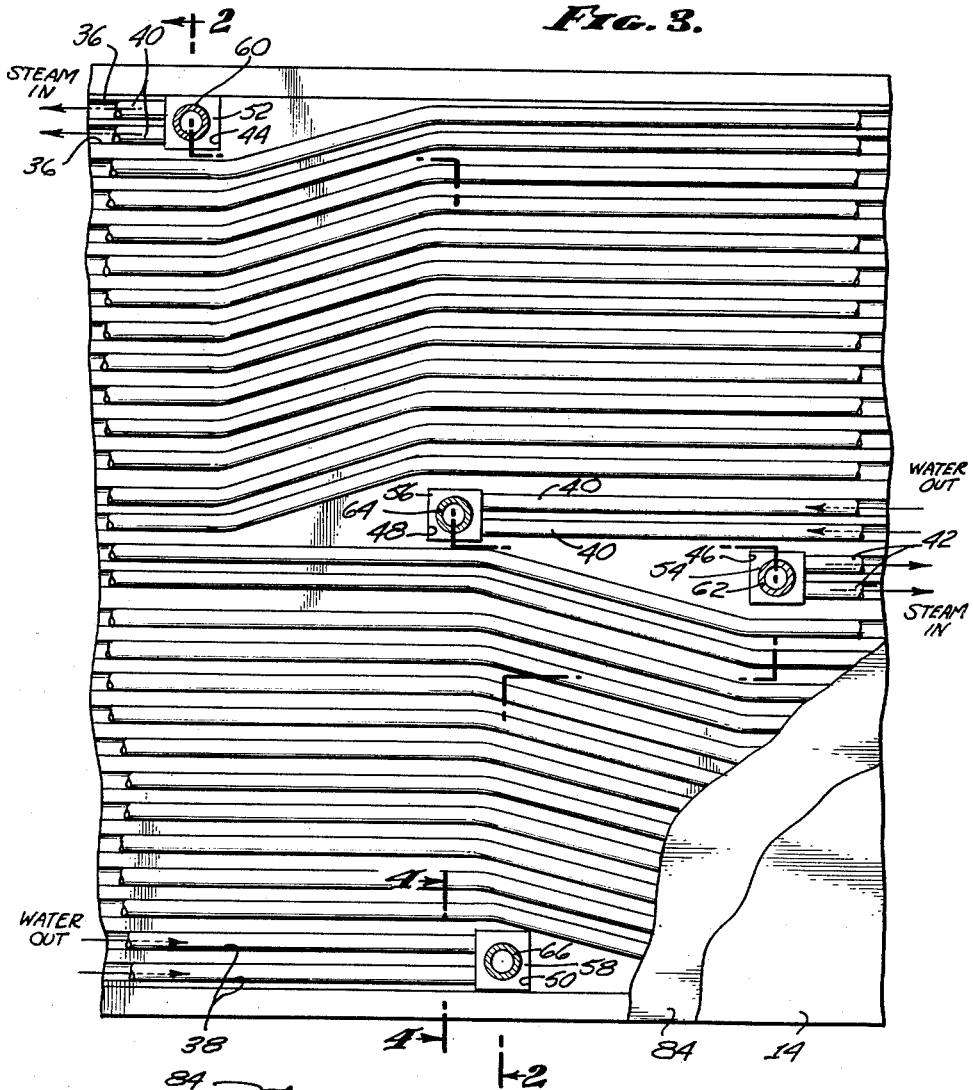
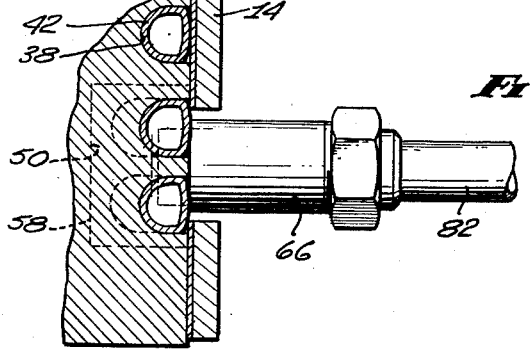
LOUIS T. FIKE
INVENTOR.
FULWIDER, MATTINGLY
& HUNTLEY
BY
ATTORNEYS.

United States Patent Office 2,932,853
Patented Apr. 19, 1960

2,932,853
TIRE CAPPING APPARATUS
Louis T. Fike, Inglewood, Calif.
Application May 23, 1957, Serial No. 661,252
8 Claims. (Cl. 18—38)

My present invention relates to tire molds for vulcanizing a cap or tread on a tire casing and molding the tread design on the cap or tread, and it relates particularly to a tire mold of novel construction which is particularly simple in construction and convenient to assemble, and which has improved heating means for more quickly and uniformly heating the cap or tread in the mold.

Prior art attempts to provide tire molds in a plurality of mold segments have generally resulted in the formation of a rubber "flash" between adjacent segments, caused by exuding of the fluent rubber under pressure from the mold cavity between the adjacent segments during the molding operation. For this reason, most tire molds are unitary in construction, rendering them difficult and expensive to manufacture with the accuracy desired, particularly where relatively intricate tread designs must be formed within the mold cavity.

Another problem in the tire mold art which has caused considerable difficulty is that most apparatus heretofore employed for heating the tire molds during operation has failed to produce the desired uniformity of heat over the entire mold cavity. Also, prior art apparatus for heating such tire molds is often relatively inefficient, with a substantial portion of the heat provided being misdirected, and not being provided in the mold cavity.

In view of these and other problems in connection with prior art tire molds, it is an object of my present invention to provide a tire mold which includes a plurality of annularly arranged mold segments that are held tightly together in their annular arrangement by means of a single external band that is provided with suitable clamping means for tightening the mold segments together so that rubber "flashes" will not appear between adjacent mold segments during the molding operation.

Another object of my present invention is to provide a tire mold of the character described in which heating coils are seated within grooves along the outer peripheral surfaces of the mold segments, whereby heat from the heating coils is conducted directly through the mold segments to the mold cavity from the heating coils. In this connection, I prefer to provide my mold segments of aluminum, which has relatively high thermal conductivity. Further, according to my present invention, the individual heating coils are compressed tightly down into their respective grooves in the outer peripheral wall of the mold segments by the outer band that holds the mold segments together, whereby the individual heating coils are distorted to substantially conform with the walls of their grooves in the outer mold surface, whereby the heat conductivity between the individual heating coils and the mold segments is highly efficient.

A further object of my present invention is to provide a multiple heating coil arrangement for steam heating a tire mold of the character described, whereby the heating will be very rapid and uniform as compared with conventional steam heating apparatus.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specifications:

Figure 1 is a perspective view of my completely assembled tire mold matrix.

Figure 2 is a sectional view along the line 2—2 in Figure 3, showing a complete cross-section of the presently preferred embodiment of my invention.

Figure 3 is a sectional view along the line 3—3 in Figure 2, particularly illustrating my presently preferred arrangement of my steam heating tubes.

Figure 4 is an enlarged fractional section along the line 4—4 in Figure 3 illustrating the manner in which my outer band compresses my heating coils down into their respective grooves, and also illustrating a presently preferred fitting device for my steam coils.

Figure 5 is a side elevation of my complete mechanism, illustrating my presently preferred clamping mechanism for cinching my outer band around the annularly arranged mold segments.

Referring to my drawings, my mold matrix 10 comprises, in general, a plurality of annularly arranged mold segments 12 which are composed of a metal that is highly heat conductive. I presently prefer to employ aluminum mold segments 12, as aluminum is not only an excellent heat conductor, but is light in weight, and therefore easy to handle in large tire molds.

The outer walls of the mold segments 12 form a generally right circular cylindrical surface when the mold segments 12 are properly annularly arranged.

I provide a cylindrical band 14 which fits over the annularly arranged mold segments 12, and which has ends that are spaced slightly apart when the band 14 is clamped tightly about the mold segments 12. Band 14 preferably comprises a hot rolled steel plate that is between about 1/8 and about 1/4 of an inch in thickness, depending upon the mold size.

Opposed clamp members 18 and 20 are fixed to the adjacent ends of band 14, preferably by welding, and each of the clamp members 16 and 18 is backed up by a suitable clamp brace 20 or 22, respectively. A plurality of spaced bolts 24 engage the clamp members 16 and 18, so that when the bolts 24 are tightened, the clamp members 16 and 18 are drawn together, to tighten the band 14 about the annularly arranged mold segments 12.

The radially inwardly facing surfaces of the mold segments 12 form a continuous mold cavity 26. Suitable ridges 28 and grooves 30 are formed in the mold cavity 26, to apply the desired tread design to the tire cap in the mold. It will be obvious that various different tread designs will be required for different types and sizes of tires. The ridges 28 and grooves 30 illustrated in the drawings will apply a tread design to a tire that is particularly suited for large earth-moving vehicles. The mold segments 12 are designed so that the ridges 28 and grooves 30 form a continuous, uninterrupted design.

Radially inwardly directed annular flanges 32 and 34 are formed along the opposite edges of the mold segments 12 in the presently preferred embodiment of my invention. These flanges 32 and 34 require that the tire casing to be inserted in the mold be spread axially by spreading the tire beads apart as the casing is being inserted or removed from the mold. This may be accomplished by any conventional tire spreading mechanism.

An alternative to the use of the two integral annular flanges 32 and 34 is to provide an annular recess (not shown) in one side of the mold segments 12, whereby a removable annular flange may be used in lieu of either of the integral radially inwardly directed annular flanges 32 and 34. By removing such a removable flange from one side of the mold, the tire casing, with the attached tread, can be inserted into and removed from the mold without requiring the tire beads to be substantially spread axially.

Referring now particularly to Figures 2, 3 and 4 of my drawings, I provide in the outer periphery of mold segments 12 a pair of U-shaped heating tube-receiving grooves 36 and 38, which extend parallel to each other, continuously from one edge of the mold segments 12 to approximately the center of the mold segments 12. I provide a similar pair of U-shaped tube-receiving grooves 36 which likewise run parallel to each other, and which extend from approximately the centers of mold segments 12 out to the other edge of the mold segments 12.

The pair of grooves 36 receive a corresponding pair of parallel tubes 40, while the pair of grooves 38 receive a corresponding pair of parallel tubes 42.

Although the tubes 40 and 42 may be composed of any suitable metal, I prefer to use a metal having a high thermal conductivity, such as copper tubes.

Referring to Figures 2 and 3, one of the mold segments 12 is milled at the upper ends of tube-receiving grooves 36, and one of the mold segments 12 is milled at the upper ends of tube-receiving grooves 38, to provide recesses 44 and 46, respectively, for respective steam input fitting blocks. Correspondingly, a pair of recesses 48 and 50 are provided at the lower ends of grooves 36 and 38, respectively, for receiving steam output fitting blocks.

Steam input fitting block 52 is seated within recess 44, and is operatively connected to the steam input ends of the parallel tubes 40. Similarly, the steam input fitting block 54 is seated within the recess 46, and is operatively connected to the steam input ends of the tubes 42.

A steam output fitting block 56 is seated within the recess 48, and is operatively connected to the output ends of tubes 40; while steam output fitting block 58 is seated in recess 50, and is operatively connected to the output ends of tubes 42.

The steam input fitting blocks 52 and 54 are provided with radially outwardly extending steam input fittings 60 and 62, respectively; while the steam output fitting blocks 56 and 58 are provided with radially outwardly extending steam output fittings 64 and 66, respectively.

It will thus be seen that I have provided two entirely independent steam heating systems about my annularly arranged mold segments 12, these systems having separate steam inputs and steam outlets, and each of these separate systems covering approximately one-half of the mold. This double steam system prevents any cool spots from developing, as such cool spots would otherwise have a tendency to develop because of the high rate of heat transfer from the tubes 40 and 42 due to the manner in which these tubes are seated in their respective grooves 36 and 38, and due to the nature of the high-conductivity mold segments 12.

It will further be noted that by providing each of these independent steam systems with a pair of parallel tubes 40 or 42, the steam is required to travel only one-half as far as it would otherwise have to travel to provide the same over-all tube length.

However, my double steam system is not required for small tire molds, and a single, uninterrupted tube will usually suffice for small molds.

I provide the band 14 which surrounds the mold segments 12 with four openings, 68, 70, 72 and 74, through which the respective fittings 60, 62, 64 and 66 pass. This permits the band 14 to engage tubes 40 and 42 along substantially their entire lengths as the band 14 is constricted about mold segments 12 by tightening bolts 24.

After band 14 has been placed around mold segments 12, with fittings 60, 62, 64 and 66 disposed through respective openings 68, 70, 72 and 74 through band 14, steam input pipes 76 and 78 are operatively connected to the respective steam input fittings 60 and 62, and steam outlet pipes 80 and 82 are operatively connected to the respective steam output fittings 64 and 66.

My U-shaped grooves 36 and 38 have substantially the same widths as the outside diameters of the tubes 40 and 42, and the bottoms of the grooves 36 and 38 are arcuate in cross-section, so that 180 degrees of the tubes will be flush in contact with the bottoms of the grooves. The grooves are slightly shallower than the outside diameters of the tubes, however, so that when the band 14 is cinched tightly about the mold segments 12, the exposed portions of the tubes will be flattened down by the band 14, in the manner best illustrated in Figure 4 of the drawings, which causes a larger portion of the outer wall of the tubing to be in contact with the U-shaped grooves than would otherwise be possible. In one satisfactory embodiment of my invention, I have provided grooves that are five-sixteenths of an inch deep and three-eighths of an inch wide. Also, this clamping down of the tubes by band 14 causes the tubes to be very tightly seated in the arcuate portions of the grooves, the net result of this large contacting surface between the tubes and the grooves, and the tightness thereof, being extremely good heat conductivity between the tubes and the mold segments 12. The tubes 40 and 42 are preferably composed of a malleable metal which also has high heat conductivity, such as copper.

I provide a relatively thin asbestos layer 84, preferably of about 1/16 of an inch thickness, to the inner surface of band 14, to reduce heat loss through the band 14. In order to completely surround the segments 12 with an asbestos layer, I prefer to place a layer of asbestos over the portion of segments 12 between the ends of band 14, and hold this asbestos in place by a thin sheet of steel approximately the width of the band 14 which is slipped under both ends of band 14.

In order to hold the mold segments 12 in exact alignment with each other, I provide a pair of pins 86 which are seated in suitable bores 88 in the mating faces of the segments 12. In a presently preferred embodiment the pins are about one-half inch in diameter and about one and one-half inches long, being seated in a three-quarter inch bore in each of the opposed mating faces of the segments 12.

It will be apparent from the above description of my present invention, and from the accompanying drawings, that I have provided a new tire capping mechanism which is simpler to construct and assemble than conventional, prior art mechanisms. All that is necessary to assemble my invention is to lay my mold segments 12 on the floor on one side, in a circular array, and to fit the tubes 40 and 42 in their respective grooves 36 and 38, and then to slide the band 14 over the mold segments 12 with applied tubes 40 and 42, cinch the band 14 tightly about the mold segments 12, and fasten the pipes 76, 78, 80 and 82 to the respective fittings 60, 62, 64 and 66.

It will also be apparent from the foregoing that I provided a tire capping mechanism which provides very uniform heating to all portions of the mold cavity 26, with this heat being applied very rapidly, and with a minimum of heat loss.

It is to be understood that the form of my invention herein shown and described is my preferred embodiment and that various changes in the shape, size and arrangement of parts may be resorted to without departing from the spirit of my invention, or the scope of my appended claims.

I claim:

1. Tire capping apparatus including a mold comprising a plurality of separate, annularly arranged mold segments having a tire-receiving cavity therein and a substantially cylindrical outer peripheral surface, aligning pin means operatively engageable between each adjacent pair of said segments, a U-shaped groove in said outer surface, said groove being slightly wider than it is deep, a steam heating tube fitted into said groove, said tube having an outside diameter slightly larger than the depth of said groove, and a substantially circular metal band disposed substantially flush along said outer peripheral surface of said mold, whereby said tube will be distorted and held tightly in its operative position in said groove by said band to a shape having over one-half of its outer surface in contact with the surface of said groove.

2. Tire capping apparatus including an annular mold having a tire-receiving cavity therein and a substantially cylindrical outer peripheral surface, a U-shaped groove in said outer peripheral surface, said U-shaped groove being slightly wider than it is deep, a steam heating tube fitted into said groove, said steam heating tube having an outside diameter slightly larger than the depth of said groove, and a substantially circular metal band disposed around the outside of said mold, said band being disposed substantially flush along said outer peripheral surface of said mold, whereby said tube will be distorted and held tightly in its operative position in said groove by said band to a shape having over one-half of its outer surface in contact with the surface of said groove.

3. Tire capping apparatus including a mold comprising a plurality of separate, annularly arranged mold segments composed of a metal having a high heat conductivity, said annularly arranged mold segments having a substantially cylindrical outer peripheral surface, spaced, U-shaped grooves disposed about said peripheral surface to substantially uniformly cover said surface, said U-shaped grooves being slightly wider than they are deep, steam heating tubes fitted into said grooves, said steam heating tubes having an outside diameter slightly larger than the depth of said grooves, means for introducing steam into said tubes, means for conducting steam from said tubes, and a substantially circular metal band disposed around the outside of said annular mold and said tubes, said band being disposed substantially flush along said outer peripheral surface of said mold, whereby said tube will be distorted and held tightly in its operative position in said groove by said band to a shape having over one-half of its outer surface in contact with the surface of said groove.

4. Tire capping apparatus, including: an annular mold having a tire-receiving cavity therein and a substantially cylindrical outer peripheral surface, a U-shaped groove formed in said outer peripheral surface, said U-shaped groove being slightly wider than it is deep; a steam heating tube fitted into said groove, said steam heating tube having an outside diameter slightly larger than the depth of said groove; a substantially circular metal band disposed around the outside of said mold, said band being disposed substantially flush along said outer peripheral surface of said mold, and said band being split at one place around its circumference with the band ends at the split being slightly separated; and clamping means operatively engageable between said band ends for selectively tightening said band about said mold whereby said tube will be distorted and held tightly in its operative position in said groove by said band to a shape having over one-half of its outer surface in contact with the surface of said groove.

5. Tire capping apparatus, including: an annular mold having a tire-receiving cavity therein and a substantially cylindrical outer peripheral surface, a U-shaped groove formed in said outer peripheral surface, said U-shaped groove being slightly wider than it is deep and said mold comprising a plurality of annularly arranged mold segments; a steam heating tube fitted into said groove, said steam heating tube having an outside diameter slightly larger than the depth of said groove; a substantially circular metal band disposed around the outside of said mold segments, said band being split at one place around its circumference with the band ends at the split being slightly separated; and clamping means operatively engageable between said band ends for selectively tightening said band about said mold segments and said tube whereby said band will distort said tube into its operative position in said groove and will hold said mold segments in their annular array.

6. Tire capping apparatus, including: a mold comprising a plurality of separate, annularly arranged mold segments composed of a metal having a high heat conductivity, said annularly arranged mold segments having a substantially cylindrical outer peripheral surface, with spaced, U-shaped grooves being substantially annularly arranged about said peripheral surface to substantially uniformly cover said surface, said U-shaped grooves being slightly wider than they are deep; steam heating tubes fitted into said grooves so as to be substantially annularly arranged about said surface, said steam heating tubes having an outside diameter slightly larger than the depth of said grooves; means for introducing steam into said tubes; means for conducting steam from said tubes; and a substantially circular metal band disposed around the outside of said annular mold and said tubes, said band being disposed substantially flush along said outer peripheral surface of said mold whereby said tubes will be distorted and held tightly in their operative position in said grooves by said band to a shape having over one-half of their outer surface in contact with the surfaces of said grooves.

7. Tire capping apparatus, including: a mold comprising a plurality of separate, annularly arranged mold segments composed of a metal having a high heat conductivity, said annularly arranged mold segments having a substantially cylindrical outer peripheral surface, with spaced, U-shaped grooves being disposed about said peripheral surface to substantially uniformly cover said surface, said U-shaped grooves being slightly wider than they are deep; steam heating tubes fitted into said grooves, said steam heating tubes having an outside diameter slightly larger than the depth of said grooves; means for introducing steam into said tubes; means for conducting steam from said tubes; a substantially circular metal band disposed around the outside of said annular mold and said tubes, said band being disposed substantially flush along said outer peripheral surface of said mold, said band being split at one place around the circumference with the band ends at the split being slightly separated; and clamping means operatively engageable between said band ends for selectively tightening said band about said mold segments to distort said tubes in their operative position in said grooves with said tubes being held tightly in their operative position in said grooves by said band to a shape having over one-half of their outer surface in contact with the surfaces of said grooves.

8. Tire capping apparatus including an annular mold having a tire-receiving cavity therein and a substantially cylindrical outer peripheral surface, a U-shaped groove in said outer peripheral surface, said U-shaped groove being slightly wider than it is deep, a steam heating tube fitted into said groove, said steam heating tube having an outside diameter slightly larger than the depth of said groove, and tube compressing means disposed around the outside of said mold, said tube compressing means encircling said outer peripheral surface of said mold, whereby said tube will be distorted and held tightly in its operative position in said groove by said tube compressing means to a shape having over one-half of its outer surface in contact with the surface of said groove.

References Cited in the file of this patent

UNITED STATES PATENTS

| | | |
|---|---|---|
| 2,030,861 | Fisher | Feb. 18, 1936 |
| 2,155,906 | Rihn | Apr. 25, 1939 |
| 2,157,967 | Riccio | May 9, 1939 |
| 2,259,975 | Hewel | Oct. 21, 1941 |
| 2,570,657 | Fannen | Oct. 9, 1951 |
| 2,591,430 | Hawkinson | Apr. 1, 1952 |